United States Patent
Nassi et al.

(10) Patent No.: US 12,524,353 B2
(45) Date of Patent: Jan. 13, 2026

(54) CANCELLING CACHE ALLOCATION TRANSACTIONS

(71) Applicant: Arm Limited, Cambridge (GB)

(72) Inventors: Luca Nassi, Antibes (FR); Abdel Hadi Moustafa, Nice (FR); Paolo Monti, Quattordio (IT); Alexander James Pane, Vallauris (FR)

(73) Assignee: Arm Limited, Cambridge (GB)

( * ) Notice: Subject to any disclaimer, the term of this patent is extended or adjusted under 35 U.S.C. 154(b) by 73 days.

(21) Appl. No.: 18/418,689

(22) Filed: Jan. 22, 2024

(65) Prior Publication Data

US 2025/0238379 A1 Jul. 24, 2025

(51) Int. Cl.
*G06F 12/123* (2016.01)
*G06F 12/0877* (2016.01)

(52) U.S. Cl.
CPC ........ *G06F 12/123* (2013.01); *G06F 12/0877* (2013.01)

(58) Field of Classification Search
CPC ............................ G06F 12/0877; G06F 12/123
See application file for complete search history.

(56) References Cited

U.S. PATENT DOCUMENTS

| | | | | |
|---|---|---|---|---|
| 2005/0114605 A1* | 5/2005 | Iyer | ...................... | G06F 12/0888 711/E12.021 |
| 2012/0222005 A1* | 8/2012 | Harris | .................. | G06F 9/45504 717/120 |
| 2014/0189204 A1* | 7/2014 | Sugimoto | ........... | G06F 12/0866 711/119 |
| 2014/0281343 A1* | 9/2014 | Kondou | ................ | G06F 9/5016 711/171 |
| 2023/0105709 A1* | 4/2023 | Patel | ................... | G06F 12/0864 711/118 |

* cited by examiner

*Primary Examiner* — Aracelis Ruiz
(74) *Attorney, Agent, or Firm* — NIXON & VANDERHYE P.C.

(57) ABSTRACT

An apparatus comprises a cache; and control circuitry to select at least one cache access transaction to be serviced by the cache from among one or more pending cache access transactions. In response to a cache allocation transaction being selected by the control circuitry for servicing by the cache, the cache is configured to start a cache allocation process for allocating data into the cache for an address not previously having a valid entry in the cache. The control circuitry is configured to determine, based on at least one workload-dependent performance heuristic, whether to cancel a remaining part of an unfinished cache allocation process performed for a given cache allocation transaction already selected for servicing by the cache, to free up bandwidth for servicing another cache access transaction.

18 Claims, 7 Drawing Sheets

CANCELLING CACHE ALLOCATION TRANSACTIONS

BACKGROUND

Technical Field

The present technique relates to the field of caches.

Technical Background

A data processing apparatus may have a cache for caching data obtained from a memory system. Data cached in the cache can be accessed faster by processing circuitry than if the data has to be accessed from memory. When referring to the cached data, the term "data" is used in the generic sense to mean any stored information (so can comprise not only data values accessible by load/store instructions, but also other information such as executable instructions or page table information).

SUMMARY

At least some examples of the present technique provide an apparatus comprising:
 a cache; and
 control circuitry to select at least one cache access transaction to be serviced by the cache from among one or more pending cache access transactions, in which:
  in response to a cache allocation transaction being selected by the control circuitry for servicing by the cache, the cache is configured to start a cache allocation process for allocating data into the cache for an address not previously having a valid entry in the cache; and
  the control circuitry is configured to determine, based on at least one workload-dependent performance heuristic, whether to cancel a remaining part of an unfinished cache allocation process performed for a given cache allocation transaction already selected for servicing by the cache, to free up bandwidth for servicing another cache access transaction.

At least some examples of the present technique provide a system comprising:
 the apparatus described above, implemented in at least one packaged chip;
 at least one system component; and
 a board,
 wherein the at least one packaged chip and the at least one system component are assembled on the board.

At least some examples of the present technique provide a chip-containing product comprising the system described above assembled on a further board with at least one other product component.

At least some examples of the present technique provide a non-transitory computer-readable medium to store computer-readable code for fabrication of an apparatus comprising:
 a cache; and
 control circuitry to select at least one cache access transaction to be serviced by the cache from among one or more pending cache access transactions, in which:
  in response to a cache allocation transaction being selected by the control circuitry for servicing by the cache, the cache is configured to start a cache allocation process for allocating data into the cache for an address not previously having a valid entry in the cache; and
  the control circuitry is configured to determine, based on at least one workload-dependent performance heuristic, whether to cancel a remaining part of an unfinished cache allocation process performed for a given cache allocation transaction already selected for servicing by the cache, to free up bandwidth for servicing another cache access transaction.

At least some examples of the present technique provide a method comprising:
 selecting at least one cache access transaction to be serviced by the cache from among one or more pending cache access transactions;
 in response to a cache allocation transaction being selected for servicing by the cache, starting a cache allocation process for allocating data into the cache for an address not previously having a valid entry in the cache; and
 determining, based on at least one workload-dependent performance heuristic, whether to cancel a remaining part of an unfinished cache allocation process performed for a given cache allocation transaction already selected for servicing by the cache, to free up bandwidth for servicing another cache access transaction.

Further aspects, features and advantages of the present technique will be apparent from the following description of examples, which is to be read in conjunction with the accompanying drawings.

DESCRIPTION OF EXAMPLES

Figure 1:
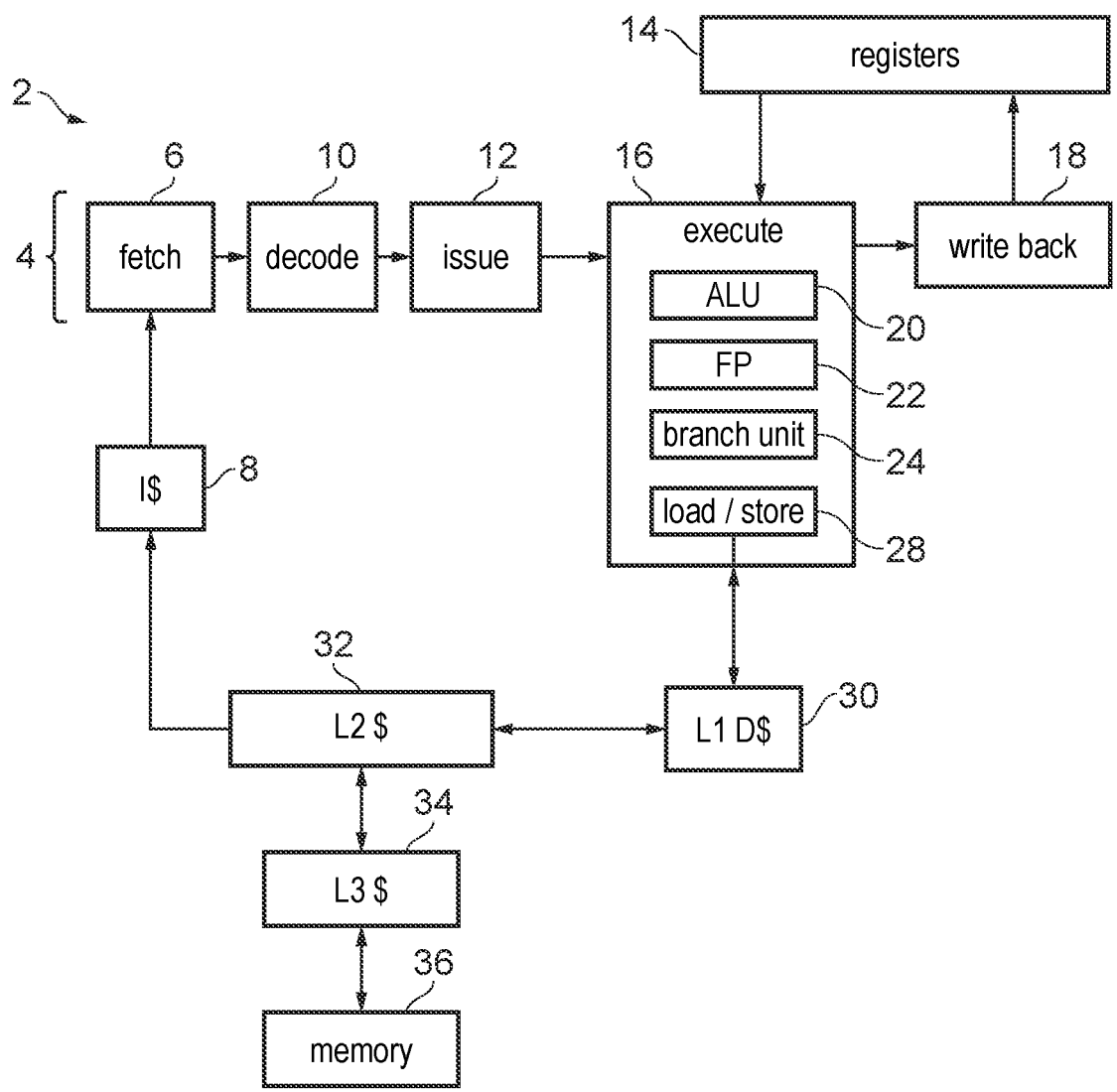
FIG. 1 illustrates an example of a data processing apparatus.

An apparatus comprises a cache, and control circuitry to select at least one cache access transaction to be serviced by the cache from among one or more pending cache access transactions. The cache access transactions can include various types of transaction, for example cache read transactions requesting that data for a given address is read from the cache, cache write transactions requesting that data for a given address is written to the cache, and cache allocation transactions requesting that data is allocated into the cache for an address not previously having a valid entry in the cache. For example, a cache allocation transaction may be generated if a cache read transaction or a cache write transaction misses in the cache, or if data is being written back to the cache following eviction from an earlier level of cache. In response to a cache allocation transaction being selected by the control circuitry for servicing by the cache, the cache starts a cache allocation process for allocating data into the cache for an address not previously having a valid entry in the cache.

Cache allocation transactions tend to be one of the slowest types of transactions serviced by a cache, because they may require a cache allocation process involving multiple steps.

To perform a single cache allocation, cache storage may be accessed multiple times (regardless of whether the allocation was triggered by a cache read operation or a cache write operation), and this can take many cycles, particularly for larger cache sizes. The cache may have a limited amount of bandwidth for servicing cache access transactions and so if a cache allocation is occupying the cache bandwidth for a long number of cycles, this can incur a higher latency on other operations, such as cache read operations, which may reduce processing performance experienced by a processor that is trying to load data from a memory system including the cache.

It is recognised that after starting a cache allocation process for a given cache allocation transaction, it may still be possible to cancel the cache allocation process part way through, without changing cache state relative to the state in which the cache would have been had the cache allocation process never started. In some scenarios, cancelling the cache allocation transaction part way through may be beneficial to performance, because if the cache allocation process would take a long time to complete, cancelling the cache allocation process can allow another more latency-critical operation, such as a pending cache read transaction, to be processed earlier. The cancelled cache allocation transaction may be retried later. However, the inventors recognised that in other scenarios, cancelling the cache allocation process part-way through can harm performance, as it wastes cache bandwidth because the part of the cache allocation process already completed has occupied some available bandwidth for a time before the cache allocation process was cancelled. Whether cancellation of a partly-completed cache allocation process is beneficial or harmful to performance can be extremely workload-dependent.

Hence, the control circuitry may determine, based on at least one workload-dependent performance heuristic, whether to cancel a remaining part of an unfinished cache allocation process performed for a given cache allocation transaction already selected for servicing by the cache, to free up bandwidth for servicing another cache access transaction. For example, the other cache access transaction serviced in the bandwidth freed up by cancelling the remaining part of the cache allocation process can be a cache read transaction. By considering at least one workload-dependent performance heuristic in the decision on whether to cancel a partly-completed cache allocation process for a given cache allocation transaction, the average-case performance can be improved, as the decision on whether to cancel or allow the allocation to continue can be tailored to properties of the current processing workload.

A wide variety of criteria can be applied for evaluating the at least one workload-dependent performance heuristic. In general, the at least one workload-dependent performance heuristic may be indicative of whether cancelling the remaining part of the unfinished cache allocation process is predicted to improve performance for a current processing workload. If the heuristic indicates a predicted performance improvement associated with cancelling the remaining part of the unfinished cache allocation process, then the given cache allocation transaction is cancelled and retried later, to free up bandwidth for another cache access transaction. If the heuristic indicates no predicted performance improvement or a prediction that performance may be harmed by cancelling the cache allocation process, then the cache allocation process is allowed to continue for the given cache allocation transaction.

A number of specific examples of such a workload-dependent performance heuristic can be applied. While a number of examples are discussed below, these examples can also be combined so that more than one type of workload-dependent performance heuristic is evaluated and the decision on whether to cancel the cache allocation process is dependent on score function derived from, or a logical (e.g. Boolean) combination of, the outcomes of each individual type of workload-dependent performance heuristic.

In some examples, if multiple distinct workload-dependent performance heuristics are applied, then the combined outcome of the workload-dependent performance heuristics may be that the cache allocation process for the given cache allocation transaction is cancelled if each of the individual workload-dependent performance heuristics indicate that the cache allocation process should be cancelled, with the cache allocation process for the given cache allocation transaction being allowed to continue if any one of the individual workload-dependent performance heuristics indicates that the cache allocation process should not be cancelled. This may recognise that cancellation of an already started cache allocation process will waste cache bandwidth, so if there is any individual heuristic which determines that cancellation of the cache allocation process is not predicted to be beneficial to performance, then it may be more efficient on average to allow the cache allocation process to continue even if other heuristics favour cancellation. However, other examples may combine multiple heuristics in a different manner (e.g. using a heuristic score derived as a function of the individual heuristic results, with the heuristic score being used to determine whether to cancel or continue the unfinished cache allocation process), or combining multiple heuristics so that if any one heuristic favours cancellation, the unfinished cache allocation process is cancelled even if another heuristic favours continuing the cache allocation process.

In some examples, the at least one workload-dependent performance heuristic is indicative of whether a current processing workload is latency-bound or bandwidth-bound. Processing performance for a latency-bound workload may be more sensitive to latency of an individual cache access request than processing performance for a bandwidth-bound workload. For example, latency-bound workload may include a greater rate of dependent memory accesses (memory accesses which depend on values loaded by earlier memory accesses) than bandwidth-bound workloads. An example of a bandwidth-bound workload can be a memory copy operation for copying a block of data from one range of the memory address space to another, for which the memory copy operation may be split into a series of loads to read the data from the first range and a series of stores to write the data to the second range—each load may have a corresponding dependent store but otherwise there may be relatively little dependency between one load and another. In contrast, an example of a latency-bound workload can be a "pointer chasing" workload, such as a traversal of a linked list structure, where there can be many instances where the data value loaded by one memory access is used to compute the address of one or more further memory accesses.

For latency-bound workloads, the cache bandwidth may not be fully occupied and processing performance can be highly sensitive to the latency experienced by certain load operations, such as the load that loads a pointer from which target addresses of a number of other memory accesses are computed. In contrast, for bandwidth-bound workloads, there may be relatively little dependency between respective memory accesses, and so the cache bandwidth may be more fully occupied, as the lack of dependencies mean there is less reason for a processor generating the memory accesses to hold memory accesses back while resolving dependencies. Hence, available cache bandwidth can be more scarce for bandwidth-bound workloads than for latency-bound workloads.

It is recognised that cancelling the cache allocation process part-way through may be more valuable for latency-bound workloads than for bandwidth-bound workloads, because the cancellation can enable a load which is potentially latency-critical in the latency-bound workload to be processed faster, which can be beneficial to performance for latency-bound workloads as there can be a number of other loads awaiting the outcome of that latency-critical load before they can be processed. In contrast, for bandwidth-bound workloads it is less likely that processing performance depends significantly on the latency of an individual load, and instead performance may be more likely to be limited by the restrictions on available cache bandwidth for processing a high rate of memory accesses being issued by processing circuitry. Hence, for bandwidth-bound workloads cancelling a cache allocation process is less preferred because the wasted cache bandwidth occupied in starting the cache allocation process and then cancelling it will limit the rate at which transactions can be serviced by the cache. Hence, the control circuitry may allow the remaining part of the unfinished cache allocation process to continue without cancellation in response to a determination that the at least one workload-dependent performance heuristic indicates that the current processing workload is bandwidth-bound (conversely the unfinished cache allocation process can be allowed to be cancelled if the current processing workload is determined to be latency-bound). This approach can improve average-case performance.

In some examples, the workload-dependent performance heuristic could explicitly indicate whether a current processing workload is bandwidth-bound or latency-bound. For example, the nature of the processing workload can be indicated by a software-provided performance hint (e.g.

a software developer may know in advance whether the types of operations being performed are likely to be more bandwidth-bound or more latency-bound).

However, other examples could provide a workload-dependent performance heuristic which deduces whether the current processing workload may be bandwidth-bound or latency-bound based on indirect measures. It will be appreciated that the categorization of workloads as "bandwidth-bound" and "latency-bound" are extremes of a continuum and some workloads may be less strongly bandwidth-bound or latency-bound (e.g. may include some portions which are more bandwidth-bound and other portions which are more latency-bound). Hence, in some cases, the workload-dependent performance heuristic may be based on a metric which provides a continuous quantity rather than a discrete classification of a workload type. For example, a metric indicative of the workload type can be queue occupancy as in the example below.

In some examples, the at least one workload-dependent performance heuristic is dependent on occupancy of at least one queue structure for queuing the cache access transactions or requests capable of causing cache access transactions to be generated. Queue occupancy can be an indirect measure of whether workload is more likely to be bandwidth-bound or latency-bound, since on average bandwidth-bound workloads may tend to have fuller queues of operations than latency-bound workloads (the latency-bound workloads have fewer cache transactions pending at a given time because dependencies between memory accesses will tend to cause processing circuitry to hold back from sending the cache memory accesses which are awaiting a value from an earlier memory access). Hence, the control circuitry may allow the remaining part of the unfinished cache allocation process to continue without cancellation in response to a determination that occupancy of the queue structure exceeds a threshold occupancy. When the queue structure is relatively full, wasting cache bandwidth by starting and then cancelling a cache allocation process is likely to risk stalls due to the queue structure becoming totally full, so it can be more beneficial to allow the cache allocation process to complete. If the occupancy of the queue structure is less than the threshold occupancy, then cancellation of the cache allocation process could be considered (depending on outcomes of any other heuristics being applied).

The occupancy-based performance heuristic could be applied to a variety of queue structures used to hold cache access transactions or requests which may subsequently cause cache access transactions to be generated.

In some examples, the at least one queue structure comprises a cache access transaction queue to queue the one or more pending cache access transactions awaiting servicing by the cache. Hence, the workload-dependent performance heuristic could be based on occupancy of the transaction queue structure from which the control circuitry selects pending cache access transactions for servicing by the cache.

The cache access transactions can include demand-triggered cache access transactions triggered in response to executed program instructions. However, in a system having at least one prefetcher which generates prefetch requests specifying addresses predicted to be accessed in future to trigger pre-emptive fetching of data into the cache in advance of the time when a demand access request is predicted to access that data, the cache access transactions could also include prefetch-triggered cache access transactions triggered in response to prefetch predictions.

For cases where the cache access transaction queue occupancy is used to evaluate the workload-dependent performance heuristic, the heuristic may depend on both occupancy of the cache access transaction queue by the demand-triggered cache access transactions and on occupancy of the cache access transaction queue by the prefetch-triggered cache access transactions. This recognises that, while given the speculative nature of prefetches the prefetch-triggered cache access transactions are unlikely to be performance-critical, nevertheless they occupy capacity in the cache access transaction queue, and so if a cache allocation was cancelled when the transaction queue is relatively full of prefetch-triggered cache access transactions, then even though currently there may be few demand-triggered cache access transactions to process, if a stall is propagated back to an earlier cache or the processing circuitry due to bandwidth being wasted by a cache allocation process starting and then being cancelled part way through, this could be harmful to overall processing performance. Therefore, it can be useful to consider occupancy by prefetch-triggered cache access transactions when evaluating a performance heuristic for determining whether to cancel the cache allocation process for a given cache based on occupancy of the transaction queue which queues the actual cache access transactions (including cache allocation transactions) themselves.

In other examples, the at least one queue structure comprises a request queue to queue requests capable of causing generation of cache access transactions to be serviced by the cache. For example, the request queue could be a queue at an ingress to a cache request processing pipeline (the earlier-mentioned transaction queue could be at an egress of the cache request processing pipeline, after one or more pipelined operations, such as set index or address tag calculation, have been performed on the request). Also, the request queue could be a queue of outgoing operations associated with a load/store unit of the processing circuitry executing the instructions that trigger load/store operations to memory, or could be a queue of outgoing operations (such as linefill requests) associated with an earlier level of cache closer to the processing circuitry. By considering occupancy of such a request queue which is handling requests an earlier stage of processing than the cache access transactions queued in the transaction queue, warning of possible high system load can be obtained earlier, reducing the risk of insufficient cache bandwidth due to bandwidth being wasted by cancelling a previously started cache allocation.

In contrast to the occupancy metric for the transaction queue, where the heuristic considers occupancy of the request queue, the at least one workload-dependent performance heuristic may be dependent on occupancy of the request queue by demand-triggered requests triggered in response to executed program instructions, but independent of occupancy of the request queue by prefetch-triggered requests triggered in response to prefetch predictions. It may be useful to exclude prefetch-triggered requests tracked in the request queue from influencing the decision on whether to cancel a cache allocation process for a given cache allocation transaction, because the prefetch-triggered requests are not critical to processing performance and the request queue's occupancy is not reduced by replaying of a cache allocation transaction as the cache allocation transaction does not need to be replayed back to the request queue (but rather may be replayed to the transaction queue). The occupancy of demand-triggered requests in the request queue (excluding prefetch-triggered requests) may be a better metric of whether a workload is latency-bound or bandwidth-bound than the total volume of both demand-triggered loads and prefetch-triggered requests in the request queue, and so by excluding prefetch-triggered requests from the occupancy metric, a better estimate can be made of whether cancelling the cache allocation process could benefit performance.

In some examples, the at least one workload-dependent performance heuristic is dependent on a status of the given cache allocation transaction. For example, the heuristic could consider how much of the cache allocation process still remains to be performed, or whether any property of the given cache allocation transaction means that latency of processing that particular cache allocation transaction may be shorter than for other instances of cache allocations.

For example, the control circuitry may allow the remaining part of the unfinished cache allocation process to continue without cancellation in response to a determination based on the at least one workload-dependent performance heuristic that a latency for completing the remaining part of the cache allocation process for the given cache allocation transaction is likely to be within acceptable bounds. If latency of completing the cache allocation process is predicted to be within acceptable bounds, it is preferable to allow it to complete to avoid wasting the cache bandwidth already incurred.

In some examples, one reason why latency may be within acceptable bounds may be if information is available which could allow some parts of the cache allocation process to be skipped. For example, the cache allocation process may include: victim selection, to choose which cache entry is allocated with the data for the new address (which may depend on reading cache replacement information from storage associated with the cache); victim eviction, to read the victim data stored in the victim cache entry if it needs to be preserved; and data writing, to write the data for the new address to the victim cache entry. In some examples, one or both of victim selection and victim eviction (or parts of these steps, in particular the part which actually reads the replacement information or victim data from cache storage) may be able to be omitted for some cache allocations.

Hence, the control circuitry may allow the remaining part of the unfinished cache allocation process to continue without cancellation in response to a determination based on the at least one workload-dependent performance heuristic that a given part of the cache allocation process can be omitted for the given cache allocation transaction because cache allocation information obtained based on a previous access to the cache is available for the given cache allocation transaction. The previous access which caused the cache allocation information to be assigned to the given cache allocation transaction could, for example, be a cache read transaction or a cache write transaction which missed in the cache to cause the cache allocation transaction to be generated, or could be an earlier attempt at servicing the cache allocation transaction itself which was cancelled to free up bandwidth for another cache access transaction (the current cache allocation transaction may be a replayed attempt at executing that same cache allocation transaction which set the cache allocation information in its earlier cancelled attempt at being serviced).

In some examples, the cache allocation information comprises an indication of which entry of the cache is a victim entry to be allocated with data in response to the given cache allocation transaction, and the given part of the cache allocation process comprises selection of the victim entry. As selection of the victim entry may include reading of replacement policy information and/or coherency state information from storage circuitry of the cache, it can be relatively slow, so if the victim selection step can be omitted because an identity of the victim entry is already known for the cache allocation transaction, the remaining part of the cache allocation process is likely to be faster to complete, and so cancelling the remaining part of the cache allocation process may be less favourable.

In some examples, the cache allocation information comprises an indication of whether evicted data evicted from a victim entry to be allocated with data in response to the given cache allocation transaction should be preserved, and the given part of the cache allocating process comprises reading the evicted data from the victim entry. For example, the indication of whether evicted data should be preserved may be determined based on a coherency state of the victim entry (if the victim entry is indicated by coherency state information as being invalid or clean then preservation of data from the victim entry may not be required). If evicted data from the victim entry does not need to be preserved, then this again eliminates an instance of reading the cache storage, making the remaining part of the cache allocation process faster and so making cancellation of the remaining part of the cache allocation process less favourable.

It will be appreciated that the cache allocation information may not always be available for the cache allocation transaction, even in an embodiment which supports the ability to record such cache allocation information from an earlier access for use in speeding up processing of a subsequent cache allocation transaction. For example, the cache allocation information initially set in association with a cache allocation transaction may be invalidated if an intervening access to the cache is made which means the information used to determine the cache allocation information is no longer reliable. For example, an intervening read, write or snoop request to a cache may cause a change in cache replacement information or coherency state information which means the preferred victim entry or indication of whether evicted data needs to be preserved specified would be different if the victim entry of decision on whether to preserve evicted data was carried out again. Hence, if there is an update to replacement policy information or a coherency status of at least one entry in the relevant set of cache entries that could accept the new data for the cache allocation transaction, the stored cache allocation information for that transaction may be invalidated, and so by the time the cache allocation transaction is processed may no longer be available. In scenarios where cache allocation information is not available for the given cache allocation transaction, this may be a hint that latency for the remaining part of the cache allocation transaction is predicted to be longer, which may make cancellation of the cache allocation process more preferable than if the cache allocation information is available from an earlier request.

In some examples, the at least one workload-dependent performance heuristic may be dependent on software-provided hint information. For example, a workload may be instrumented by a programmer or compiler with hints on whether the memory access pattern is likely to be latency-bound or bandwidth-bound. For example, hint instructions (or hint variants of other functional instructions) may be included in the executable program code, which can trigger a signal to be provided to the cache to evaluate whether a workload is more likely to be bandwidth-bound or latency-bound.

In some examples, the at least one workload-dependent performance heuristic may be dependent on whether a higher-priority cache access transaction is detected while it is still possible to cancel a remaining part of an unfinished cache allocation process performed for a given cache allocation transaction. In some examples, the higher-priority cache access transaction could be any cache read transaction (which may be considered to be higher priority than a cache allocation transaction). However, other examples may provide architectural support for identifying certain load instructions as being latency-critical load instructions, so that the cache read transactions triggered based on such latency-critical load instructions may be considered to be the higher-priority cache access transactions. A software developer or compiler can use the latency-critical load instructions for loads expected to access an address pointer on which a number of other loads depend, for example. Hence, when a given cache allocation transaction is being processed, in some examples, the cache allocation process could be cancelled is if there is a pending higher-priority cache access transaction, but not if there is no higher-priority cache access transaction pending.

Specific examples are described with reference to the drawings.

FIG. 1 schematically illustrates an example of a data processing apparatus 2. The data processing apparatus has a processing pipeline 4 which includes a number of pipeline stages. In this example, the pipeline stages include a fetch stage 6 for fetching instructions from an instruction cache 8; a decode stage 10 for decoding the fetched program instructions to generate micro-operations (decoded instructions) to be processed by remaining stages of the pipeline; an issue stage 12 for checking whether operands required for the micro-operations are available in a register file 14 and issuing micro-operations for execution once the required operands for a given micro-operation are available; an execute stage 16 for executing data processing operations corresponding to the micro-operations, by processing operands read from the register file 14 to generate result values; and a writeback stage 18 for writing the results of the processing back to the register file 14. It will be appreciated that this is merely one example of possible pipeline architecture, and other systems may have additional stages or a different configuration of stages. For example in an out-of-order processor an additional register renaming stage could be included for mapping architectural registers specified by program instructions or micro-operations to physical register specifiers identifying physical registers in the register file 14. In some examples, there may be a one-to-one relationship between program instructions decoded by the decode stage 10 and the corresponding micro-operations processed by the execute stage. It is also possible for there to be a one-to-many or many-to-one relationship between program instructions and micro-operations, so that, for example, a single program instruction may be split into two or more micro-operations, or two or more program instructions may be fused to be processed as a single micro-operation.

The execute stage 16 includes a number of processing units, for executing different classes of processing operation. For example the execution units may include an arithmetic/logic unit (ALU) 20 for performing arithmetic or logical operations; a floating-point unit 22 for performing operations on floating-point values, a branch unit 24 for evaluating the outcome of branch operations and adjusting the program counter which represents the current point of execution accordingly; and a load/store unit 28 for performing load/store operations to access data in a memory system 8, 30, 32, 34, 36. In this example the memory system include a level one data cache 30, the level one instruction cache 8, a shared level two cache 32, a level three cache 34, and main system memory 36. It will be appreciated that this is just one example of a possible memory hierarchy and other arrangements of caches can be provided. For example, some systems may have a different number of cache levels. The specific types of processing unit 20 to 28 shown in the execute stage 16 are just one example, and other implementations may have a different set of processing units or could include multiple instances of the same type of processing unit so that multiple micro-operations of the same type can be handled in parallel. It will be appreciated that FIG. 1 is merely a simplified representation of some components of a possible processor pipeline architecture, and the processor may include many other elements not illustrated for conciseness, such as branch prediction mechanisms or address translation or memory management mechanisms.

Figure 2:
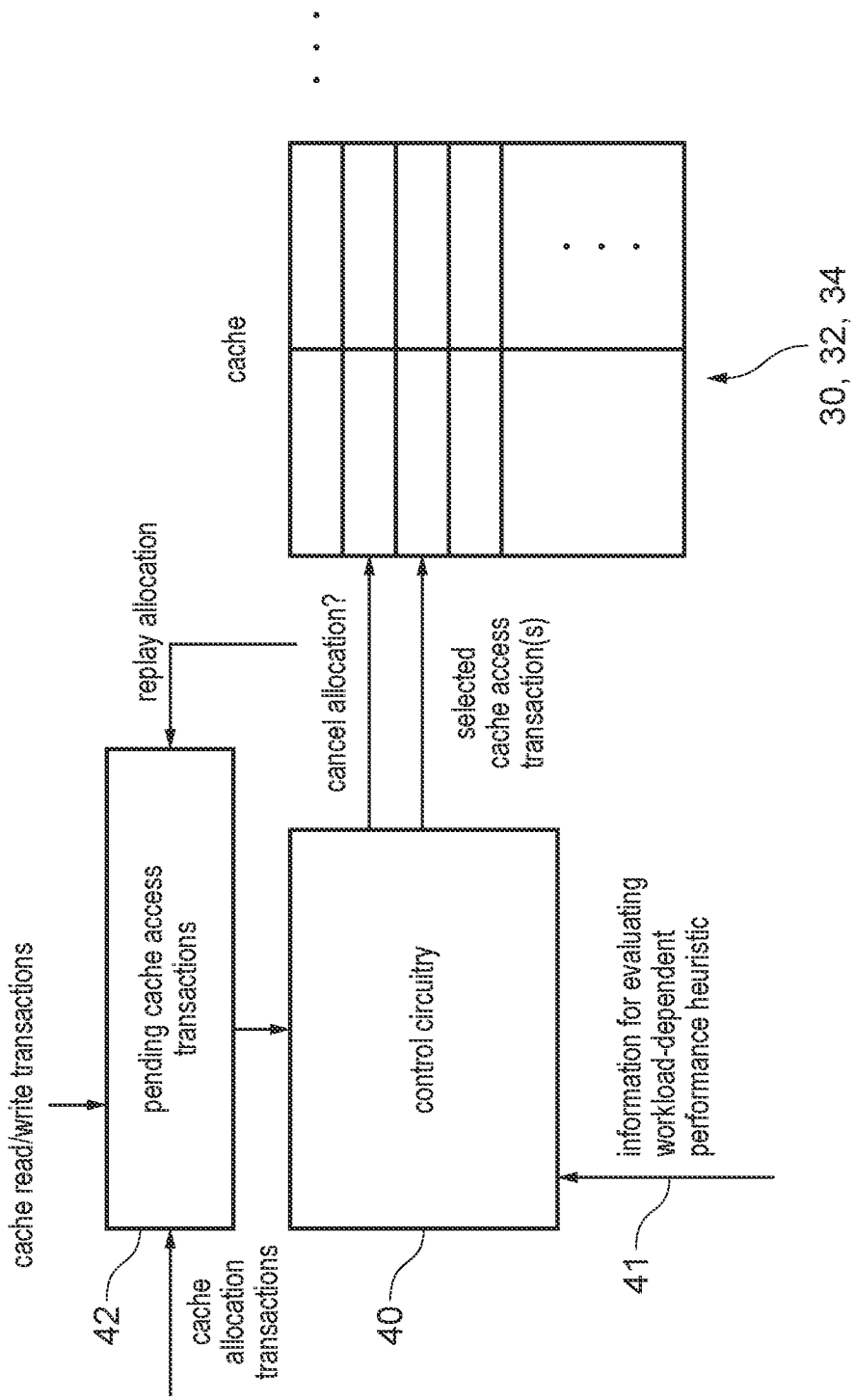
FIG. 2 illustrates a cache and control circuitry.

FIG. 2 illustrates an example of circuitry associated with a cache, such as the level 1 data cache 30, level 2 cache 32 or level 3 cache 34 shown in FIG. 1. While this technique could be used with any cache, it can be particularly useful for one of the larger capacity caches such as the level 2 cache 32 or level 3 cache 34, for which the larger cache capacity causes cache storage lookups to be slower than in a smaller level 1 cache 30, and so the latency of cache allocations tends to be longer for the level 2 or 3 caches than for the level 1 cache 30.

As shown in FIG. 2, the cache 30, 32, 34 is associated with control circuitry 40 which is responsible for arbitrating between a set of pending cache access transactions 42 awaiting servicing by the cache 30, 32, 34. The pending cache access transactions 42 could include:

cache read transactions requesting that cached data is read from the cache (if present in the cache) and returned to the requester (e.g. the requester could be the load/store unit 28 of the processor or could be a unit in an earlier level of cache 30, 32 which is requesting a linefill from a later level of cache 32, 34);

cache write transactions requesting that write data provided by a requester is written to an entry of the cache corresponding to a particular memory address; and cache allocation transactions requesting that a new cache entry is allocated for an address which did not previously have a valid entry in the cache.

Cache read and write transactions may trigger a lookup of the cache to determine whether the address of the read/write request hits in the cache, and if so then the hit entry is read/written. Cache allocation transactions can be triggered by a miss being detected when looking up the cache for a read/write transaction, which may require a linefill request to be issued to a subsequent level of cache 32, 34 or to main memory 36, to request that the data for the required address is obtained and returned to the cache for allocation. Cache allocation transactions can also be caused by data being written back from an earlier level of cache (e.g. a writeback from level 1 or level 2 may trigger allocation in level 2 or level 3). The cache allocation process is relatively lengthy because as well as actually writing the allocated data into the cache, the cache 30, 32, 34 may first perform some steps for selecting which cache entry is a victim entry to be allocated with the new data and, if necessary, preserving the evicted data evicted from the victim entry to make way for the new data. These steps can require further reads of information stored in the cache storage structures, and so cache allocation transactions may be much slower to process than cache read transactions or cache write transactions.

The control circuitry 40 may use an arbitration policy to arbitrate between the pending cache access transactions 42. In some implementations, the arbitration policy could be a simple first in first out policy, with the oldest pending transaction being selected ahead of any younger transaction. Other implementations could use a more complex policy which may enable some younger transactions to bypass older transactions, e.g. based on a prioritisation scheme which may enable certain transactions to be identified as "high-priority" which should be selected in preference to an older transaction not identified as "high-priority" (provided that reordering is allowed, given other architectural constraints—e.g. write transactions to the same address may not be reordered, and some transactions may not be able to be reordered even if to a different address, e.g. based on assigning a group identifier which identifies requests which, within the group, should be handled in the order they are received). Any known arbitration policy may be used to select which pending transaction is to be serviced next.

If a cache allocation transaction is selected for being serviced by the cache, then once the correspond cache allocation process is started, there may be a certain window within which it would be possible to cancel the cache allocation process and restart later, without any adverse effect on cache state. Up to the point at which the cache allocation process is non-reversible, cancelling the cache allocation process could enable another cache access transaction, such as a cache read transaction, to be serviced earlier, which may be beneficial to performance in some scenarios (e.g. if there are a lot of other memory accesses which will depend on the data loaded by the pending cache read transaction). In other scenarios, cancelling the cache allocation process risks harming performance, as the waste of bandwidth incurred in starting the cache allocation without finishing it reduces the effective bandwidth available for other transactions. If there are few individual cache access transactions to which performance is particularly sensitive, then the overall performance may depend more on the rate at which transactions as a whole can be serviced by the cache, which will tend to decrease if there is wasted bandwidth due to cancelling cache allocation transactions once already started. Hence, sometimes cancellation of allocations is beneficial and other times it is not.

To predict whether it could be beneficial to cancel a cache allocation process once already started, the control circuitry 40 receives information 41 for evaluating at least one workload-dependent performance heuristic. The heuristic gives a hint on whether cancellation of a partially completed cache allocation process is more likely to benefit or harm performance, and may be a heuristic which evaluates information which is specific to a current processing workload. Based on the heuristic, the control circuitry 40 determines whether, when an opportunity exists where an already started cache allocation process could be cancelled to free up bandwidth for servicing another cache access transaction instead, that cache allocation process should actually be cancelled. If the heuristic indicates that it would be likely to be more beneficial to performance to allow the cache allocation process to continue, then the cache allocation process is not cancelled.

Figure 3:
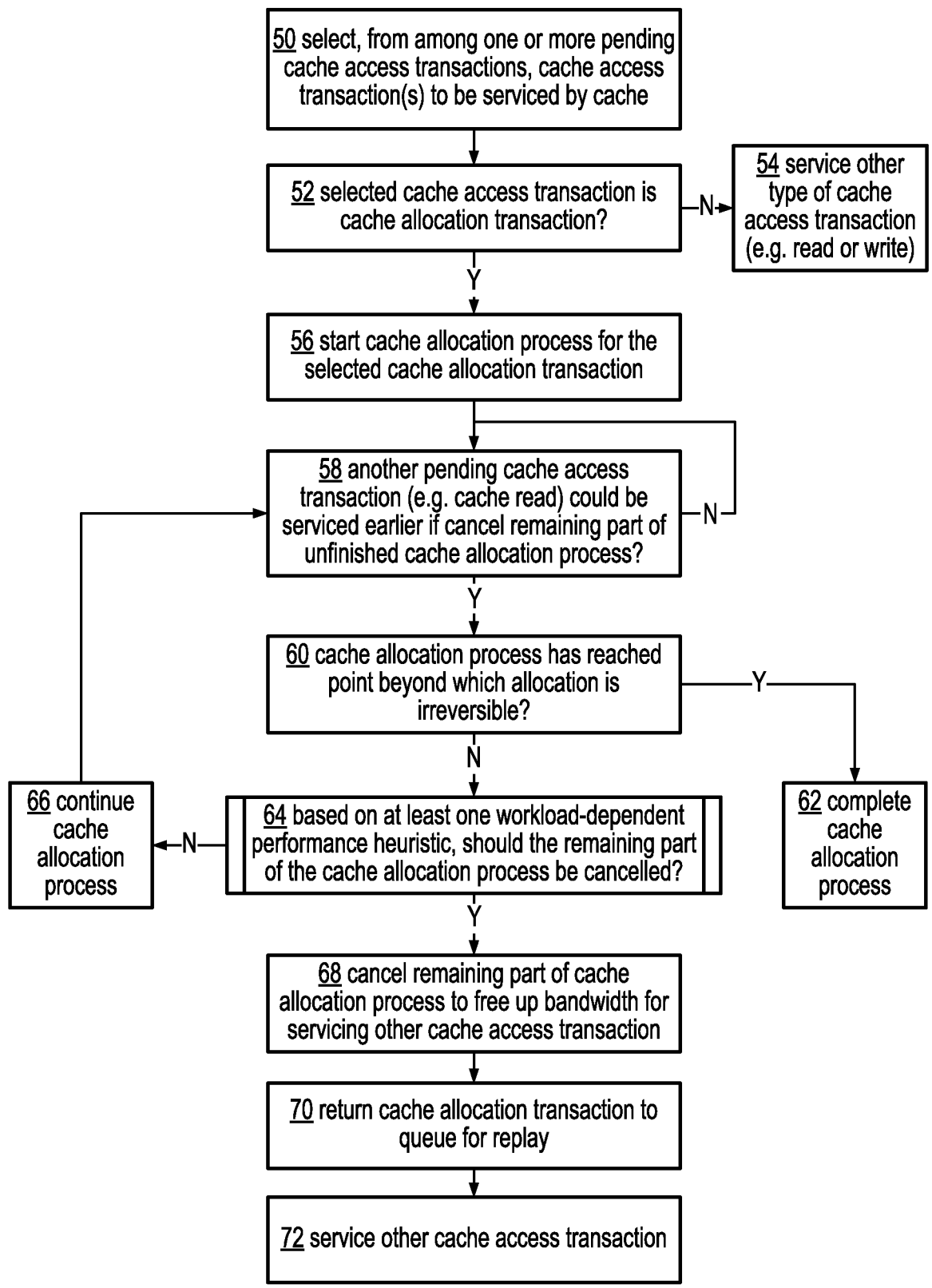
FIG. 3 illustrates steps for servicing a cache allocation transaction.

FIG. 3 illustrates a flow diagram illustrating steps for controlling servicing of cache access transactions selected in a given cycle of arbitration. At step 50 the control circuitry 40 selects, from among one or more pending cache access transactions 42, at least one cache access transaction to be serviced by the cache 30, 32, 34. Some implementations may select a single cache access transaction per selection cycle. Other implementations may be able to handle more than one cache access transaction per selection cycle (e.g. if the cache 30, 32, 34 has a banked structure enabling lookups for more than one set of the cache in parallel). If more than one transaction is selected in the same selection cycle, then the subsequent steps of FIG. 3 can be performed for each selected transaction.

For a given transaction selected at step 50, at step 52 the control circuitry 40 determines whether the selected cache access transaction is a cache allocation transaction. If not, then at step 54 another type of cache access transaction (e.g. read or write transaction) is serviced.

If the selected cache access transaction is a cache allocation transaction, then at step 56 the cache 30, 32, 34 starts a cache allocation process for the selected cache allocation transaction. The cache allocation process can include multiple steps including, for example, victim entry selection, victim data eviction from the selected victim entry, and writing of newly allocated data to the cache.

Having started the cache allocation process, at step 58 the control circuitry 40 determines whether another cache access transaction (such as a cache read transaction) is pending which could be serviced earlier if the remaining part of the unfinished cache allocation process was cancelled. For example, this other pending cache access transaction could be a new pending cache access transaction which was received since the arbitration performed at step 50 selected the cache allocation transaction, and which would have won the arbitration at step 50 if it had been available, in which case the cache allocation transaction would not have been selected. However, as the cache allocation transaction has already started processing, the control circuitry 40 evaluates whether it might be better to cancel the cache allocation transaction to allow the other transaction to be processed earlier.

At step 60, the control circuitry 40 determines whether the cache allocation process started for the previously selected cache allocation transaction has reached a point beyond which the allocation is irreversible. For example, the cache allocation process may still be reversible if the write of the newly allocated data to the victim cache entry has not yet started, and the data which would have been evicted from the victim cache entry still remains validly stored in the victim cache entry. If the cache allocation process has reached or passed beyond the point at which the allocation becomes irreversible, then at step 62 the control circuitry allows the current cache allocation process to complete without cancellation.

If it is still possible to reverse the cache allocation process, then at step 64 the control circuitry 40 evaluates at least one workload-dependent performance heuristic, for example based on the hint information 41 supplied the control circuitry 40 and/or on internal metrics maintained by the control circuitry 40. Based on at least one workload-dependent performance heuristic, the control circuitry determines whether the remaining part of the cache allocation process should be cancelled for the cache allocation transaction selected at step 50. A number of examples of evaluating the workload-dependent performance heuristic at step 64 are set out in FIGS. 5 to 11 discussed below.

If the control circuitry 40 determines that the cache allocation process should not be cancelled, then at step 66 the cache allocation process continues and the method returns to step 58. It may be that as the cache allocation process continues, some of the conditions checked at steps 58, 60, 64 may differ from the conditions checked earlier in the cache allocation process. Eventually, if the cache allocation process is not cancelled, then the cache allocation process will reach the point of no return and will complete at step 62.

If at step 64 the control circuitry 40 determines that the cache allocation process should be cancelled, then at step 68 the remaining part of the cache allocation processes cancelled to free up bandwidth for servicing the other cache access transaction detected at step 58. At step 70, the control circuitry 40 returns the cache allocation transaction to the queue of pending cache access transactions 42 for replay in a later cycle. To be selected in a later cycle, the replayed cache allocation transaction may need to win arbitration again at step 50. At step 72, the other cache access transaction detected at step 58 is selected to be serviced using the bandwidth freed up by cancelling the remaining part of the cache allocation process.

Figure 4:
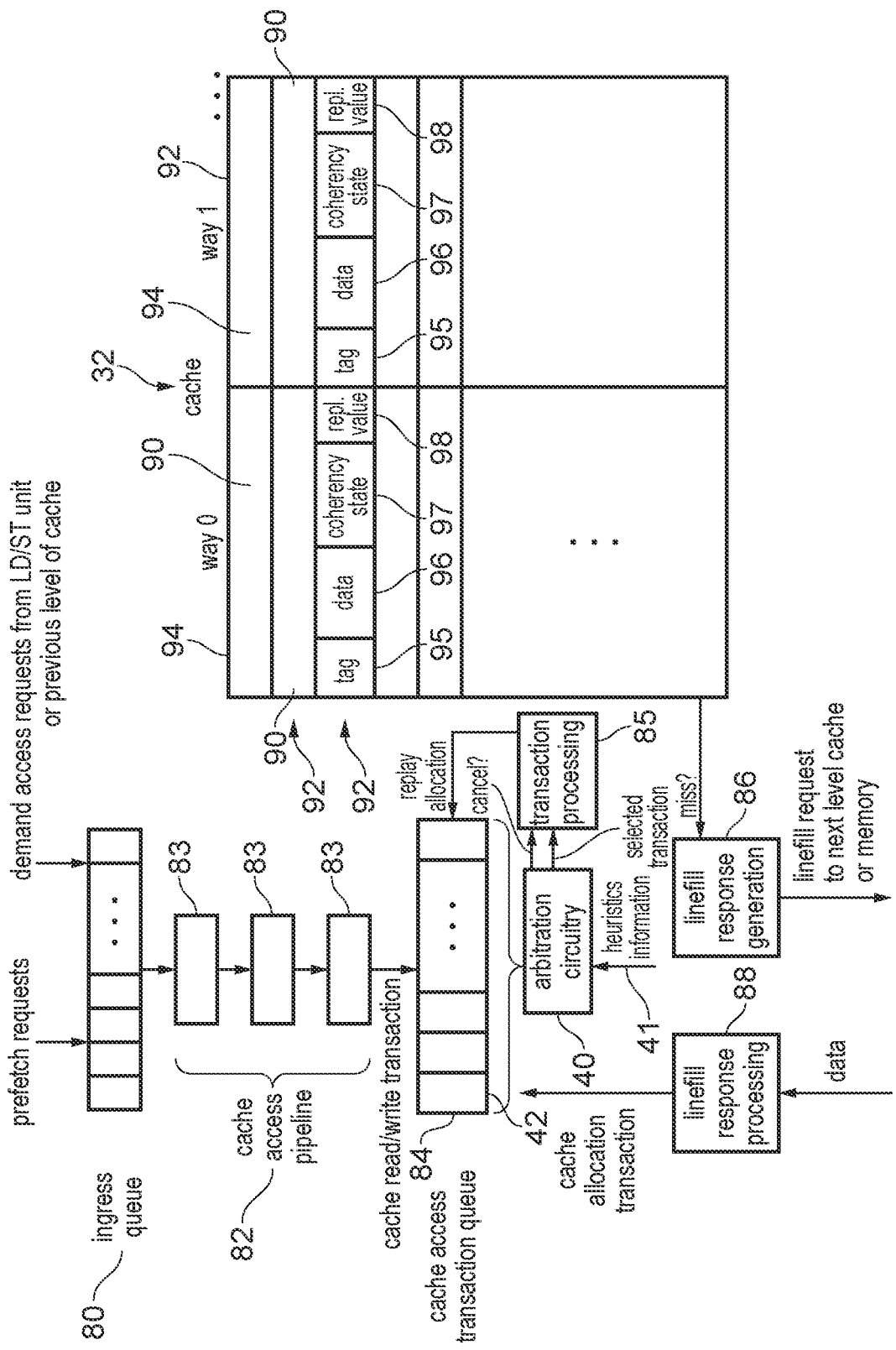
FIG. 4 illustrates a more detailed example.

FIG. 4 illustrates in more detail some of the control logic associated with a given cache, which in this example is the level 2 cache 32, but it will be appreciated that similar techniques could also be applied to other caches. Requests targeting the cache are received at an ingress queue 80. The requests received at the ingress queue 80 could include demand-triggered access requests generated by the load/store unit 28 or by an earlier level of cache (e.g. the level 1 cache 30). While the ingress queue 80 is shown at the input to the level 2 cache 32 in the example of FIG. 4, in other examples the ingress queue 80 could be physically located at the location of the source of the requests, e.g. at the load/store unit 28 or level 1 cache 30.

Requests from the ingress queue 80 are input to a cache access pipeline 82 comprising a number of stages 83 of processing the cache access requests to generate the pending cache access transactions 42 to be serviced by the cache. The particular number and function of the respective pipeline stages 83 can vary depending on the particular implementation, but as an example the cache access pipeline 82 may perform operations such as computing a set index and a lookup tag from the address of the cache access request, which are used in a subsequent lookup of the cache 32.

The read/write cache access transactions processed by the cache access pipeline 82 are queued in a cache access transaction queue 84 to await servicing by the cache 32. The transaction queue 84 may also hold cache allocation transactions generated following a miss detected for a read/write transaction or a writeback request received from the previous level of cache. Arbitration circuitry (an example of the control circuitry) 40 selects between the queued transactions according to a given arbitration policy, and forwards one or more selected cache access transactions to transaction processing circuitry 85 which handles servicing of the transactions.

The cache 32 is a set-associative cache having a certain number of entries 90 logically arranged as a number of cache sets 92, each set 92 comprising at least two ways 94. Any given address corresponds to a particular one of the sets 92, and the data for that address can be stored in any one of the entries 90 in that set 92, but cannot be stored in other sets. The address hashing function for mapping a given memory address to a particular set 92 is implemented in the set index computation logic within the cache access pipeline 82. The lookup tag computed by the pipeline 82 distinguishes which particular address within the subset of addresses which map to the same set is the address being looked up in the cache for a given cache lookup.

While FIG. 4 shows a 2-way set-associative structure for conciseness, other examples can have greater associativity (number of ways 94) than 2. Each entry 90 within a given set specifies at least:

- a cache tag 95 derived from an address of the data 96 held in that entry;
- the cached data 96 itself (which could be functional data values targeted by load/store operations, but could also be other information such as instructions, a memory address, one or more page table entries, etc.);
- a coherency state indicator 97 specifying a coherency state of the cache entry 90. For example, the coherency state could distinguish invalid entries from valid entries. For valid entries, the coherency state could also distinguish between one or more coherency states dependent on the particular coherency protocol being used, e.g. for indicating whether the cached data 96 is clean or dirty and/or whether the cached data 96 is held in a shared state or unique state.
- a replacement policy value 98 used to track likelihood of future reuse of the data in the cached entry by demand access requests. For example, the replacement policy value 98 could be set according to any known replacement policy, e.g. least recently used (LRU) or re-reference interval prediction (RRIP). The replacement policy values 98 of each entry 90 in a given set 92 are used when performing victim selection for a cache allocation, to select which entry of the set 92 is the victim entry to be allocated with the data for the new address being allocated a valid entry in the cache.

For read/write transactions, the transaction processing circuitry 85 triggers a cache lookup based on the set index and lookup tag generated by the cache access pipeline 82, to detect whether the address specified by the corresponding access request from the ingress queue 80 hits or misses in the cache. The cache lookup reads out the tags 95 of each entry 90 in the set 92 corresponding to the set index computed based on the address, and the tags 95 are compared with the lookup tag generated by the cache access pipeline 82 for the address being looked up in the cache. If any of the stored tags 95 matches the lookup tag then a hit is detected in the cache, and for read transactions the stored data 96 is read out from the entry 90 having the matching tag 95 and the read out data is returned to the requester, while for write transactions write data specified by the transaction is written to the entry 90 having the matching tag 95. On a hit in the cache, the replacement policy value 98 of the hit entry having the matching tag 95 can be updated to reduce likelihood of that entry being selected for eviction in the near future.

If none of the entries 90 in the indexed set 92 have a tag 95 matching the lookup tag for the looked up address, then a cache miss is detected, and a linefill request is generated by linefill request generation circuitry 86 to request that the data for the address that missed in the cache 90 is obtained from a next level cache (e.g. level 3 cache 34) or memory 36. When the data is returned from the cache 34 or memory 36, linefill response processing circuitry 88 generates a cache allocation transaction which is allocated to the cache access transaction queue 84 to await selection by the arbitration circuitry 40. The cache allocation transaction specifies the data returned in the linefill as well as other information such as the lookup tag and set index previously used for the cache read/write transaction that returned a miss.

When the arbitration circuitry 40 selects a cache allocation transaction for servicing by the cache 32, the transaction processing circuitry 85 has a state machine which controls a multi-step cache allocation process, including the following steps, each of which may (unless they can be omitted) require an access to the cache storage:

victim selection, where the replacement policy values 98 of the set 92 corresponding to the address for which allocation is required are read out and used to select one of the entries 90 in that set 92 as a victim entry to be allocated with the data for the new address not previously having a valid entry in the cache. The particular algorithm for determining the victim entry can depend on the replacement policy used. The victim selection may also depend on the coherency state information 97 for each entry 90 in the set 92 (e.g. the victim selection algorithm may preferentially select invalid entries in preference to valid entries, and (if clean and dirty entries have equal replacement policy values) select a clean entry in preference to a dirty entry to reduce overhead of writeback.

victim eviction, where, depending on the coherency state 97 of the victim entry, the cached data 96 of the victim entry may be read out and written back to a subsequent level of cache 34 or to memory 36. The victim eviction read may not be necessary if the coherency state 97 indicates that the victim entry is invalid or clean, but may be performed if the victim entry is dirty.

data writing, where the data for the address newly allocated into the cache is written to the data field 96, the cache tag 95 is updated to correspond to that address, the coherency state 97 is updated based on the state of the data allocated into the cache, and the replacement policy value 98 is set to an initial value dependent on the particular replacement policy used.

As noted above, the arbitration circuitry 40 is able to cancel the cache allocation process part-way through, if the allocation process has not yet reached a point beyond which the allocation is irreversible (e.g. the allocation may be irreversible once the data writing step has started). If the cache allocation transaction is cancelled then the transaction is replayed by passing it back to the cache access transaction queue 84 to once more await selection by the arbitration circuitry 40. Another cache access transaction can be selected instead to use the bandwidth freed by cancellation of the cache allocation transaction.

FIGS. 5 to 11 show various examples of heuristics which could be used by the control circuitry (arbitration circuitry) 40 at step 64 of FIG. 3 to determine whether the remaining part of an unfinished cache allocation process should be cancelled.

Figure 5:
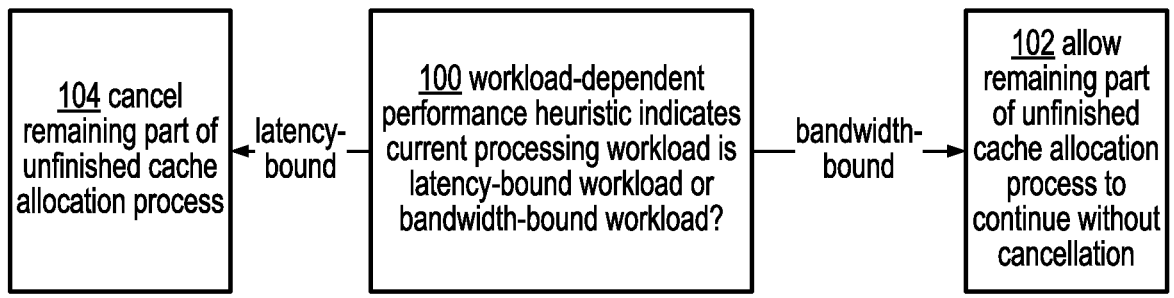
FIGS. 5 to 11 illustrate various examples of workload-dependent performance heuristics that can be used to determine whether to cancel a remaining part of an unfinished cache allocation process.

FIG. 5 shows a first example of a workload-dependent performance heuristic. At step 100, the control circuitry 40 determines whether the workload-dependent performance heuristic indicates that a current processing workload is a latency-bound workload or bandwidth-bound workload. For example, this could be determined from a configuration input signal supplied to the cache control circuitry 40, and/or from software hints set by a software developer (e.g. by annotating program code with hint instructions which trigger hint signals to be sent to the control circuitry 40), which may specify the type of workload being executed at a given time. Alternatively, an indirect metric which predicts whether the workload is latency-bound or bandwidth-bound could be used, such as queue occupancy as in the example of FIG. 6. If the current processing workload is detected to be bandwidth-bound, then at step 102 the control circuitry allows the remaining part of the unfinished cache allocation process to continue without cancellation, since for bandwidth-bound workloads bandwidth is scarce and the limited bandwidth affects performance more than latency for any individual request, and so it is better to avoid wasting precious bandwidth by cancelling a cache allocation transaction once it has already consumed some bandwidth. On the other hand, if the workload is latency-bound then its performance is much more sensitive to the latency of an individual request and it is more likely that there is spare latency available, and so at step 104 the remaining part of the unfinished cache allocation process is cancelled to allow another request (which could be a request whose latency affects performance significantly) to be processed instead.

Figure 6:
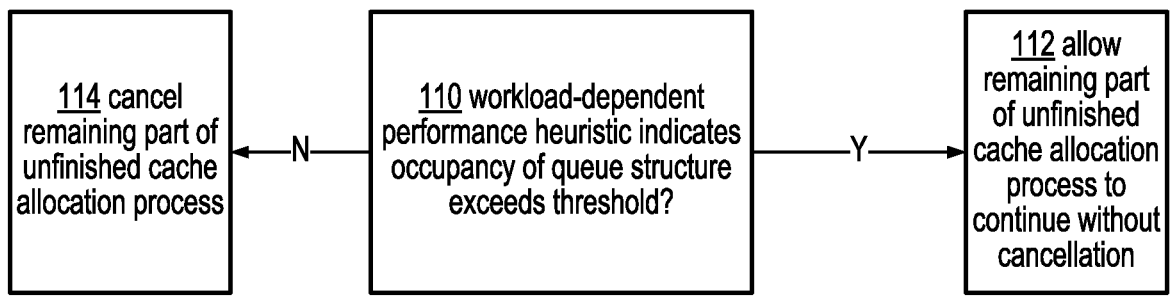

FIG. 6 illustrates a second example showing a particular way of evaluating the likelihood of current workloads being latency-bound or bandwidth-bound. This approach does not rely on any software instrumentation or hints or on external configuration inputs, but can be implemented using hardware circuit logic without the software developer's involvement. It is observed that for bandwidth-bound applications there can be relatively little dependency between memory accesses, and so the load/store unit 28 in the processor has less reason to hold back memory access requests from the memory system due to dependencies. Therefore, queue structures such as the ingress queue 80 and cache access transaction queue 84 will tend to have higher average occupancy levels if the current workload is bandwidth-bound than when the current workload is latency-bound. Therefore, the occupancy of such a queue structure 80, 84 can be used as a predictor of the type of workload and used to determine the workload-dependent performance heuristic used to evaluate whether to cancel a partly completed cache allocation process. At step 110 of FIG. 6, the control circuitry 40 determines whether the workload-dependent performance heuristic indicates that occupancy of a queue structure 80, 84 used to hold cache access transactions or requests that may trigger cache access transactions is greater than a threshold occupancy. If the current queue occupancy exceeds the threshold, then at step 112 the remaining part of the unfinished cache allocation process is allowed to continue without cancellation, as the high queue occupancy is an indication that bandwidth is scarce and so should not be wasted. If the current queue occupancy does not exceed the threshold, then at step 114 the remaining part of the unfinished cache allocation process can be cancelled as there is enough spare bandwidth that the wasted portion of bandwidth occupied by the cache allocation process should not be problematic, and it is more likely that there are a few individual requests whose latency will greatly affect performance of other dependent memory accesses that are being held back by the load/store unit 28 due to dependency hazards. Hence, considering queue occupancy when considering whether to cancel the cache allocation process can help improve average case performance.

Figure 7:
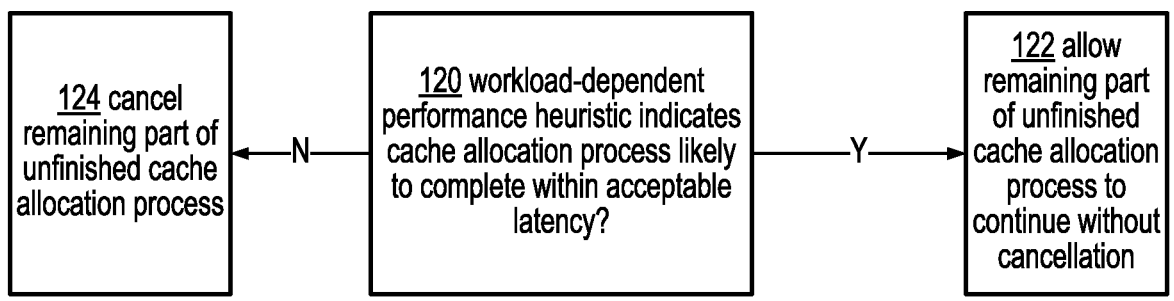

FIG. 7 shows another example, based on the recognition that cache allocation processes do not always take the same amount of latency. If at the point when the opportunity to cancel the cache allocation process, the control circuitry 40 determines at step 120 that the cache allocation process is likely to complete within an acceptable latency (e.g. because there is not much of the cache allocation process remaining, or because information is available that allows certain parts of the cache allocation process to be omitted), then at step 122, the control circuitry allows the cache allocation process to continue (e.g. even if the current workload is a latency-bound workload or queue occupancy is low), as the penalty of continuing the cache allocation process is low. On the other hand, if the cache allocation process is unlikely to complete within an acceptable latency, then at step 124 the remaining part of the unfinished cache allocation process is cancelled.

Figure 8:
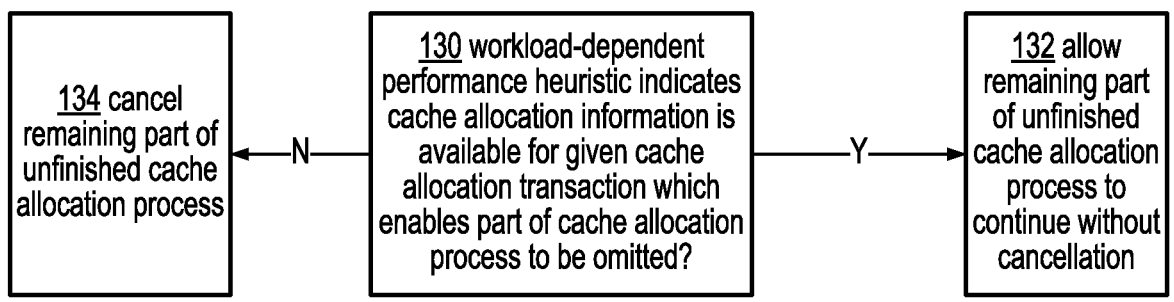

FIG. 8 shows an example based on the particular reason why a cache allocation process might sometimes be predicted to complete with less latency than other times. Some implementations may associate a pending cache allocation transaction stored in the transaction queue 84 with one or more items of cache allocation information derived from an earlier request, which if available for a given cache allocation transaction can allow the corresponding cache allocation process to complete faster than if the cache allocation information is not available. For example, if the replacement policy values 98 of the cache set 92 that can accept the allocation have already been compared before to select the victim entry in response to an earlier request, then an indication of the victim entry can be stored in the transaction queue 84 along with the cache allocation transaction, and then when the cache allocation process is performed for that cache allocation transaction, the victim selection step can be omitted (eliminating an additional read of the cache storage for obtaining the replacement policy values 98) to save latency. As another example, if the coherency state 97 of the victim entry is already known from an earlier access, the coherency state 97 (or information derived from the coherency state 97 indicating, based on the coherency state 97, whether it would be required to preserve the data 96 evicted from the victim entry) can be indicated in the transaction queue 84 along with the cache allocation transaction, and if it is still available at the time of processing the cache allocation transaction, this can allow a determination of whether it is necessary to preserve the data evicted from the victim entry, without needing to read the cache storage again to obtain coherency state information 97 of the victim entry. The earlier request which caused that cache allocation information to be specified for the cache allocation transaction could, for example, be the cache read/write transaction which missed in the cache to trigger generation of the cache allocation information (which may have caused information read from the set 92 that encountered the miss to be preserved for use at the time of allocation), or the earlier request could be an earlier attempt at servicing the cache allocation transaction itself, if the current transaction is a replayed attempt that was cancelled earlier. Once a cache allocation transaction becomes associated with such cache allocation information derived from an earlier access, the cache allocation information need not necessarily still be available by the time the cache allocation transaction is serviced, because the cache allocation information may be invalidated if another transaction accesses the same set 92 of the cache causing a change to the coherency state 97 or replacement policy values 98 which were used to set the cache allocation information. Hence, it is not guaranteed that cache allocation information will still be available at the time the cache allocation transaction service, but if it is available it can help to reduce latency of servicing the cache allocation transaction.

Hence, as shown in FIG. 8, in some examples, at step 130 the control circuitry determines whether the workload-dependent performance heuristic indicates that the cache allocation information is available for the given cache allocation transaction which enables part of the corresponding cache allocation process to be omitted (e.g. the omitted part could be victim selection and/or evicted data preservation). If the cache allocation information is available and enables part of the cache allocation process to be omitted, then at step 132 the remaining part of the unfinished cache allocation process can be allowed to continue without cancellation. If there is no cache allocation information available or the specified information would not enable part of the cache allocation process to be omitted, then at step 134 the remaining part of the unfinished cache allocation process may be cancelled as it is predicted that latency would be relatively long for completing the entire cache allocation process.

Figure 9:
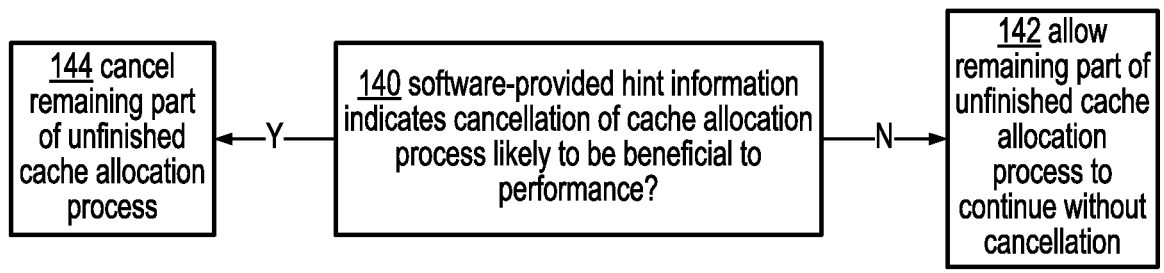

FIG. 9 shows another example of a workload-dependent performance heuristic based on software-provided hint information. If at step 140 the software-provided hint information (e.g. detected based on hint instructions included in the program being executed on the processing pipeline 4) indicates that cancellation of cache allocation processes is more likely to be beneficial to performance than harmful to performance, then at step 144 the remaining part of the cache allocation process is cancelled. Otherwise, the remaining part of the cache allocation process is allowed to continue at step 142.

Figure 10:
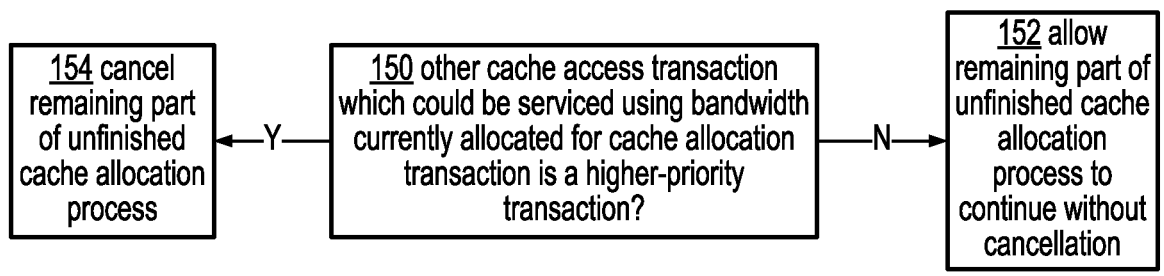

FIG. 10 shows another example which could be used in implementations which support the ability to flag certain cache allocation transactions as higher-priority transactions. For example, some instruction set architectures may support the ability to identify certain load operations as latency-critical loads, which could be used by software developers or compilers in scenarios where a given load has a lot of dependent operations which use the value loaded by the load, so that the latency for that given load is likely to greatly affect overall processing performance. If such a latency-critical load is executed than the corresponding cache allocation transaction may be identified as a higher-priority transaction to be prioritised over other lower-priority transactions. The arbitration policy implemented by arbitration circuitry 40 may select higher-priority transactions in preference to lower-priority transactions such as cache allocation transactions, but in scenarios where the cache allocation transaction is already selected for servicing, the ability to cancel the cache allocation transaction to allow servicing of the higher-priority transaction may be beneficial. However, such cancellation may be considered less beneficial if there are no higher-priority transactions pending. Hence, at step 150, if the other cache access transaction which could be serviced using the bandwidth currently allocated for the cache allocation transaction is a higher-priority transaction, then at step 154 the remaining part of the cache allocation process can be cancelled, while if there is no higher-priority transaction pending then the remaining part of the cache allocation process can be allowed to continue at step 152.

FIGS. 5 to 10 show a number of individual examples of a workload-dependent performance heuristic. However, it is also possible to combine more than one of these criteria into a combined heuristic. In some examples, a number of individual heuristics could be used to compute an overall heuristic score which is used to determine the likelihood of cancelling a cache allocation process improving performance, and so used to determine whether or not that cancellation should take place.

However, a simpler implementation can simply be to combine the results of a number of individual heuristics in a logical OR or AND operation (or other Boolean combination). For example, some implementations may provide an overall combined heuristic result that indicates that the cache allocation process is to be cancelled if all of the individual heuristics indicate that cancellation is preferable, but if any one cache allocation process indicates that there is a reason not to cancel the already started cache allocation process, then the cache allocation is allowed to continue.

Figure 11:
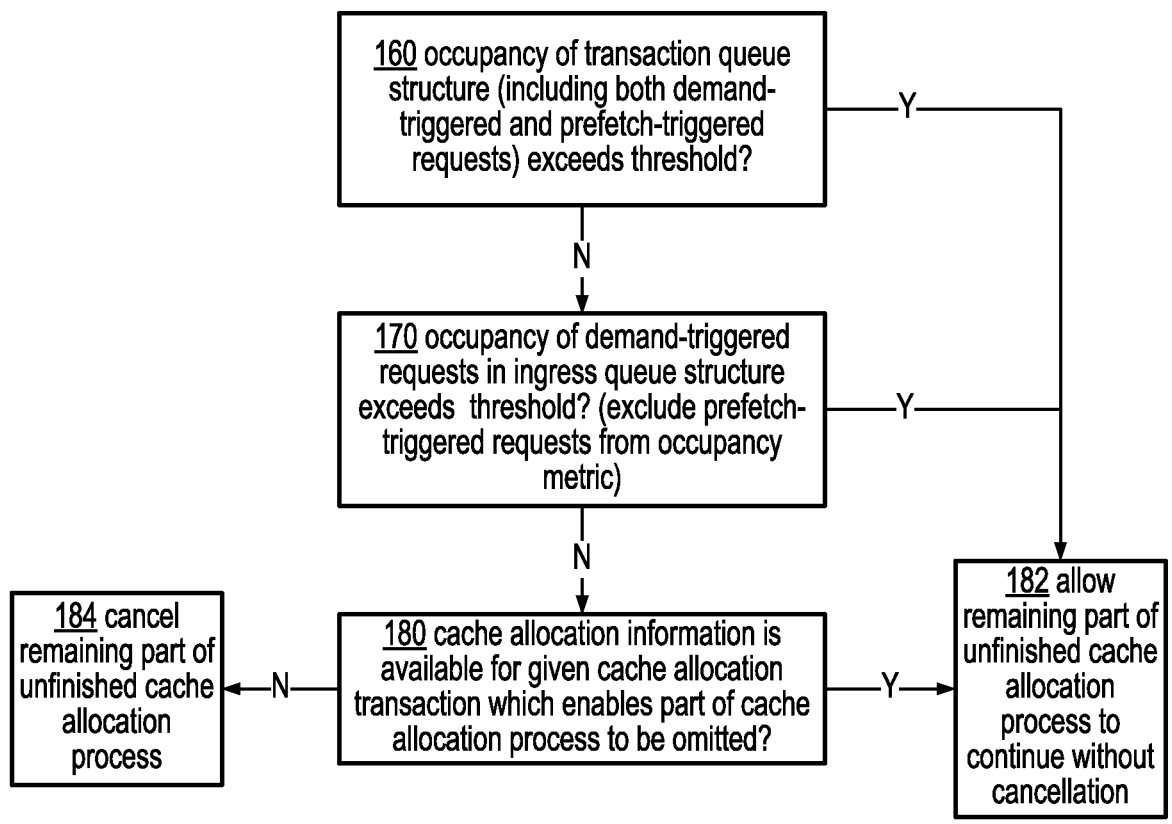

For example, FIG. 11 illustrates an example combining the approaches shown in FIGS. 6 and 8, but with a variant in which two different queue occupancies are considered, namely the occupancy of the ingress queue 80 and the occupancy of the transaction queue 84.

At step 160, the control circuitry 40 determines whether occupancy of the transaction queue structure 84 exceeds a threshold. This occupancy metric is tracked based on both prefetch-triggered transactions triggered by prefetch requests generated by a prefetcher based on speculative predictions of addresses which may be accessed in future, and on demand-triggered transactions triggered by demand memory access requests arising due to load/store instructions executed by the processing pipeline 4. If the occupancy of the transaction queue structure 84 exceeds the threshold, then at step 182 the remaining part of the unfinished cache allocation process is allowed to continue without cancellation.

At step 170, the control circuitry 40 determines whether occupancy of demand-triggered requests in the ingress queue 80 exceeds a threshold (this time, entries of the ingress queue 80 occupied by prefetch-triggered requests are excluded from influencing the occupancy metric used to evaluate step 170). The threshold for evaluating ingress queue occupancy at step 170 can have a different threshold value to the threshold for evaluating transaction queue occupancy at step 160. Again, if the occupancy metric for the ingress queue 80 exceeds a threshold, the method proceeds from step 170 to step 182 to allow the cache allocation process to continue without cancellation.

At step 180, the control circuitry 40 determines whether any cache allocation information is available for the given cache allocation transaction which enables part of the cache allocation process to be omitted (as at step 130 of FIG. 8), and if so then again at step 182 the cache allocation continues without cancellation as the omission of parts of the cache allocation process may mean the remaining latency is predicted to be relatively low.

If all of the metrics indicate that cancellation is preferred (the occupancy of both queues 80, 84 is lower than the respective thresholds, and no information is available allowing omission of certain steps of the cache allocation process), then at step 184 the remaining part of the unfinished cache allocation process is cancelled, as these heuristics indicate that it is more likely that performance may be improved by servicing another request instead.

For all of the flowcharts discussed above, it will be appreciated that these flowcharts show one possible sequence of steps, but other examples could carry out similar functionality in a different sequence. For example, some steps may be performed in a different order relative to each other, or may be performed at least partially in parallel.

Concepts described herein may be embodied in a system comprising at least one packaged chip. The apparatus described earlier is implemented in the at least one packaged chip (either being implemented in one specific chip of the system, or distributed over more than one packaged chip). The at least one packaged chip is assembled on a board with at least one system component. A chip-containing product may comprise the system assembled on a further board with at least one other product component. The system or the chip-containing product may be assembled into a housing or onto a structural support (such as a frame or blade).

Figure 12:
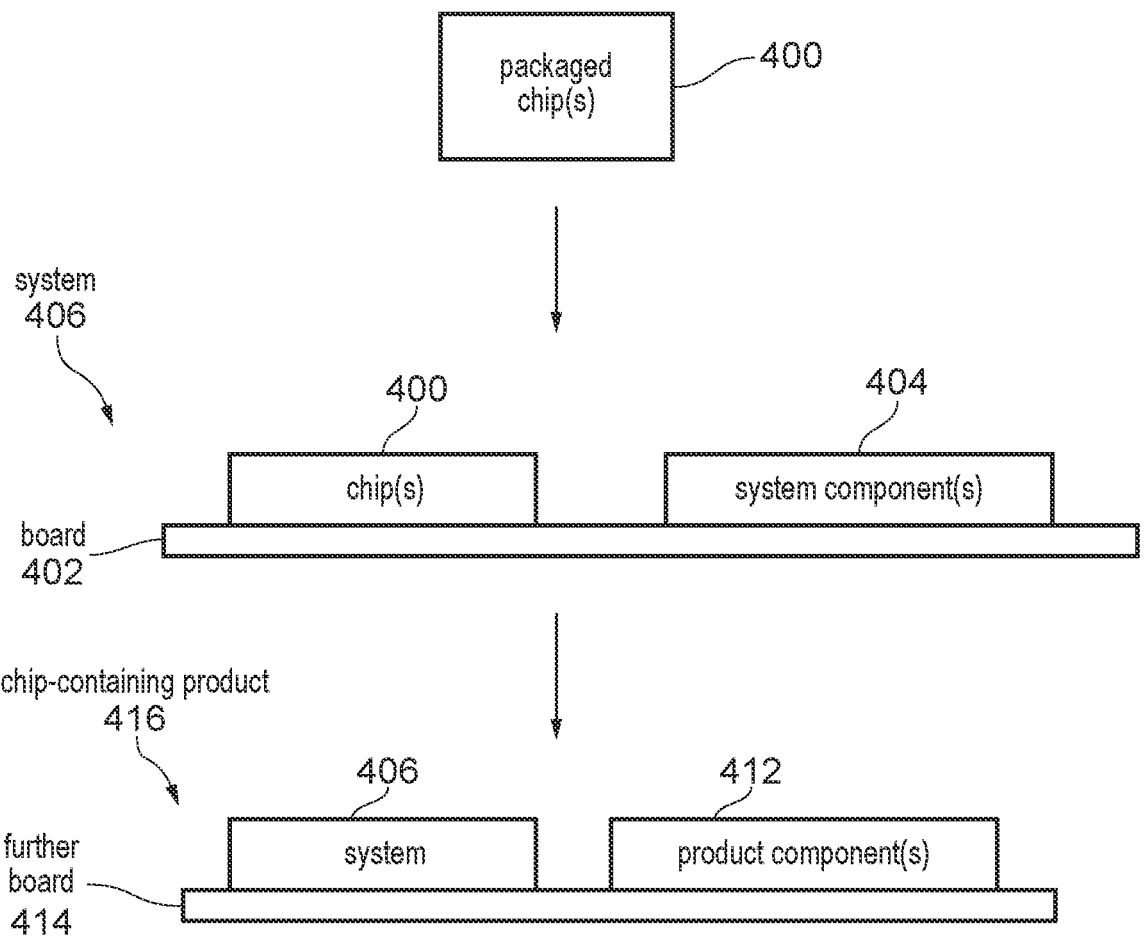
FIG. 12 illustrates a system and a chip-containing product.

As shown in FIG. 12, one or more packaged chips 400, with the apparatus described above implemented on one chip or distributed over two or more of the chips, are manufactured by a semiconductor chip manufacturer. In some examples, the chip product 400 made by the semiconductor chip manufacturer may be provided as a semiconductor package which comprises a protective casing (e.g. made of metal, plastic, glass or ceramic) containing the semiconductor devices implementing the apparatus described above and connectors, such as lands, balls or pins, for connecting the semiconductor devices to an external environment. Where more than one chip 400 is provided, these could be provided as separate integrated circuits (provided as separate packages), or could be packaged by the semiconductor provider into a multi-chip semiconductor package (e.g. using an interposer, or by using three-dimensional integration to provide a multi-layer chip product comprising two or more vertically stacked integrated circuit layers).

In some examples, a collection of chiplets (i.e. small modular chips with particular functionality) may itself be referred to as a chip. A chiplet may be packaged individually in a semiconductor package and/or together with other chiplets into a multi-chiplet semiconductor package (e.g. using an interposer, or by using three-dimensional integration to provide a multi-layer chiplet product comprising two or more vertically stacked integrated circuit layers).

The one or more packaged chips 400 are assembled on a board 402 together with at least one system component 404 to provide a system 406. For example, the board may comprise a printed circuit board. The board substrate may be made of any of a variety of materials, e.g. plastic, glass, ceramic, or a flexible substrate material such as paper, plastic or textile material. The at least one system component 404 comprise one or more external components which are not part of the one or more packaged chip(s) 400. For example, the at least one system component 404 could include, for example, any one or more of the following: another packaged chip (e.g. provided by a different manufacturer or produced on a different process node), an interface module, a resistor, a capacitor, an inductor, a transformer, a diode, a transistor and/or a sensor.

A chip-containing product 416 is manufactured comprising the system 406 (including the board 402, the one or more chips 400 and the at least one system component 404) and one or more product components 412. The product components 412 comprise one or more further components which are not part of the system 406. As a non-exhaustive list of examples, the one or more product components 412 could include a user input/output device such as a keypad, touch screen, microphone, loudspeaker, display screen, haptic device, etc.; a wireless communication transmitter/receiver; a sensor; an actuator for actuating mechanical motion; a thermal control device; a further packaged chip; an interface module; a resistor; a capacitor; an inductor; a transformer; a diode; and/or a transistor. The system 406 and one or more product components 412 may be assembled on to a further board 414.

The board 402 or the further board 414 may be provided on or within a device housing or other structural support (e.g. a frame or blade) to provide a product which can be handled by a user and/or is intended for operational use by a person or company.

The system 406 or the chip-containing product 416 may be at least one of: an end-user product, a machine, a medical device, a computing or telecommunications infrastructure product, or an automation control system. For example, as a non-exhaustive list of examples, the chip-containing product could be any of the following: a telecommunications device, a mobile phone, a tablet, a laptop, a computer, a server (e.g. a rack server or blade server), an infrastructure device, networking equipment, a vehicle or other automotive product, industrial machinery, consumer device, smart card, credit card, smart glasses, avionics device, robotics device, camera, television, smart television, DVD players, set top box, wearable device, domestic appliance, smart meter, medical device, heating/lighting control device, sensor, and/or a control system for controlling public infrastructure equipment such as smart motorway or traffic lights.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Some examples are set out in the following clauses:

1. An apparatus comprising:
    a cache; and
    control circuitry to select at least one cache access transaction to be serviced by the cache from among one or more pending cache access transactions, in which:
    in response to a cache allocation transaction being selected by the control circuitry for servicing by the cache, the cache is configured to start a cache allocation process for allocating data into the cache for an address not previously having a valid entry in the cache; and
    the control circuitry is configured to determine, based on at least one workload-dependent performance heuristic, whether to cancel a remaining part of an unfinished cache allocation process performed for a given cache allocation transaction already selected for servicing by the cache, to free up bandwidth for servicing another cache access transaction.

2. The apparatus according to clause 1, in which the at least one workload-dependent performance heuristic is indicative of whether cancelling the remaining part of the unfinished cache allocation process is predicted to improve performance for a current processing workload.

3. The apparatus according to any of clauses 1 and 2, in which the at least one workload-dependent performance heuristic is indicative of whether a current processing workload is latency-bound or bandwidth-bound.

4. The apparatus according to clause 3, in which the control circuitry is configured to allow the remaining part of the unfinished cache allocation process to continue without cancellation in response to a determination that the at least one workload-dependent performance heuristic indicates that the current processing workload is bandwidth-bound.

5. The apparatus according to any of clauses 1 to 4, in which the at least one workload-dependent performance heuristic is dependent on occupancy of at least one queue structure for queuing the cache access transactions or requests capable of causing cache access transactions to be generated.

6. The apparatus according to clause 5, in which the control circuitry is configured to allow the remaining part of the unfinished cache allocation process to continue without cancellation in response to a determination that occupancy of the queue structure exceeds a threshold occupancy.

7. The apparatus according to any of clauses 5 and 6, in which the at least one queue structure comprises a cache access transaction queue to queue the one or more pending cache access transactions awaiting servicing by the cache.

8. The apparatus according to clause 7, in which the at least one workload-dependent performance heuristic is dependent on occupancy of the cache access transaction queue by demand-triggered cache access transactions triggered in response to executed program instructions and is also dependent on occupancy of the cache access transaction queue by prefetch-triggered cache access transactions triggered in response to prefetch predictions.

9. The apparatus according to any of clauses 5 to 8, in which the at least one queue structure comprises a request queue to queue requests capable of causing generation of cache access transactions to be serviced by the cache.

10. The apparatus according to clause 9, in which the at least one workload-dependent performance heuristic is dependent on occupancy of the request queue by demand-triggered requests triggered in response to executed program instructions and is independent of occupancy of the request queue by prefetch-triggered requests triggered in response to prefetch predictions.

11. The apparatus according to any of clauses 1 to 10, in which the at least one workload-dependent performance heuristic is dependent on a status of the given cache allocation transaction.

12. The apparatus according to any of clauses 1 to 11, in which the control circuitry is configured to allow the remaining part of the unfinished cache allocation process to continue without cancellation in response to a determination based on the at least one workload-dependent performance heuristic that a latency for completing the remaining part of the cache allocation process for the given cache allocation transaction is likely to be within acceptable bounds.

13. The apparatus according to any of clauses 1 to 12, in which the control circuitry is configured to allow the remaining part of the unfinished cache allocation process to continue without cancellation in response to a determination based on the at least one workload-dependent performance heuristic that a given part of the cache allocation process can be omitted for the given cache allocation transaction because cache allocation information obtained based on a previous access to the cache is available for the given cache allocation transaction.

14. The apparatus according to clause 13, in which the cache allocation information comprises an indication of which entry of the cache is a victim entry to be allocated with data in response to the given cache allocation transaction, and the given part of the cache allocation process comprises selection of the victim entry.

15. The apparatus according to any of clauses 13 and 14, in which the cache allocation information comprises an indication of whether evicted data evicted from a victim entry to be allocated with data in response to the given cache allocation transaction should be preserved, and the given part of the cache allocating process comprises reading the evicted data from the victim entry.

16. The apparatus according to any of clauses 1 to 15, in which the at least one workload-dependent performance heuristic is dependent on software-provided hint information.

17. The apparatus according to any of clauses 1 to 16, in which the at least one workload-dependent performance heuristic is dependent on whether a higher-priority cache access transaction is detected while it is still possible to cancel a remaining part of an unfinished cache allocation process performed for a given cache allocation transaction.

18. A system comprising:
   the apparatus of any of clauses 1 to 17, implemented in at least one packaged chip;
   at least one system component; and
   a board,
   wherein the at least one packaged chip and the at least one system component are assembled on the board.

19. A chip-containing product comprising the system of clause 18, assembled on a further board with at least one other product component.

20. A non-transitory computer-readable medium to store computer-readable code for fabrication of an apparatus comprising:
   a cache; and
   control circuitry to select cache access transactions to be serviced by the cache from among pending cache access transactions, in which:
   in response to a cache allocation transaction being selected by the control circuitry for servicing by the cache, the cache is configured to start a cache allocation process for allocating data into the cache for an address not previously having a valid entry in the cache; and
   the control circuitry is configured to determine, based on at least one workload-dependent performance heuristic, whether to cancel a remaining part of an unfinished cache allocation process performed for a given cache allocation transaction already selected for servicing by the cache, to free up bandwidth for servicing another cache access transaction.

21. A method comprising:
   selecting at least one cache access transaction to be serviced by the cache from among one or more pending cache access transactions;
   in response to a cache allocation transaction being selected for servicing by the cache, starting a cache allocation process for allocating data into the cache for an address not previously having a valid entry in the cache; and
   determining, based on at least one workload-dependent performance heuristic, whether to cancel a remaining part of an unfinished cache allocation process performed for a given cache allocation transaction already selected for servicing by the cache, to free up bandwidth for servicing another cache access transaction.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

In the present application, lists of features preceded with the phrase "at least one of" mean that any one or more of those features can be provided either individually or in combination. For example, "at least one of: A, B and C" encompasses any of the following options: A alone (without B or C), B alone (without A or C), C alone (without A or B), A and B in combination (without C), A and C in combination (without B), B and C in combination (without A), or A, B and C in combination.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus comprising:
   a cache; and
   control circuitry configured to select at least one cache access transaction to be serviced by the cache from among one or more pending cache access transactions, in which:
   in response to a cache allocation transaction being selected by the control circuitry for servicing by the cache, the cache is configured to start a cache allocation process for allocating data into the cache for an address not previously having a valid entry in the cache;
   the control circuitry is configured to determine, based on at least one workload-dependent performance heuristic, whether to cancel a remaining part of an unfinished cache allocation process performed for a given cache allocation transaction already selected for servicing by the cache, to free up bandwidth for servicing another cache access transaction;
   the at least one workload-dependent performance heuristic is indicative of whether a current processing workload is latency-bound or bandwidth-bound; and
   the control circuitry is configured to allow the remaining part of the unfinished cache allocation process to continue without cancellation in response to a determination that the at least one workload-dependent performance heuristic indicates that the current processing workload is bandwidth-bound.

2. The apparatus according to claim 1, in which the at least one workload-dependent performance heuristic is indicative of whether cancelling the remaining part of the unfinished cache allocation process is predicted to improve performance for a current processing workload.

3. The apparatus according to claim 1, in which the at least one workload-dependent performance heuristic is dependent on occupancy of at least one queue structure for queuing the cache access transactions or requests capable of causing cache access transactions to be generated.

4. The apparatus according to claim 3, in which the control circuitry is configured to allow the remaining part of the unfinished cache allocation process to continue without cancellation in response to a determination that occupancy of the queue structure exceeds a threshold occupancy.

5. The apparatus according to claim 3, in which the at least one queue structure comprises a cache access transaction queue to queue the one or more pending cache access transactions awaiting servicing by the cache.

6. The apparatus according to claim 5, in which the at least one workload-dependent performance heuristic is dependent on occupancy of the cache access transaction queue by demand-triggered cache access transactions triggered in response to executed program instructions and is also dependent on occupancy of the cache access transaction queue by prefetch-triggered cache access transactions triggered in response to prefetch predictions.

7. The apparatus according to claim 3, in which the at least one queue structure comprises a request queue to queue requests capable of causing generation of cache access transactions to be serviced by the cache.

8. The apparatus according to claim 7, in which the at least one workload-dependent performance heuristic is dependent on occupancy of the request queue by demand-triggered requests triggered in response to executed program instructions and is independent of occupancy of the request queue by prefetch-triggered requests triggered in response to prefetch predictions.

9. The apparatus according to claim 1, in which the at least one workload-dependent performance heuristic is dependent on a status of the given cache allocation transaction.

10. The apparatus according to claim 1, in which the control circuitry is configured to allow the remaining part of the unfinished cache allocation process to continue without cancellation in response to a determination based on the at least one workload-dependent performance heuristic that a latency for completing the remaining part of the cache allocation process for the given cache allocation transaction is likely to be within acceptable bounds.

11. The apparatus according to claim 1, in which the control circuitry is configured to allow the remaining part of the unfinished cache allocation process to continue without cancellation in response to a determination based on the at least one workload-dependent performance heuristic that a given part of the cache allocation process can be omitted for the given cache allocation transaction because cache allocation information obtained based on a previous access to the cache is available for the given cache allocation transaction.

12. The apparatus according to claim 11, in which the cache allocation information comprises an indication of which entry of the cache is a victim entry to be allocated with data in response to the given cache allocation transaction, and the given part of the cache allocation process comprises selection of the victim entry.

13. The apparatus according to claim 11, in which the cache allocation information comprises an indication of whether evicted data evicted from a victim entry to be allocated with data in response to the given cache allocation transaction should be preserved, and the given part of the cache allocating process comprises reading the evicted data from the victim entry.

14. The apparatus according to claim 1, in which the at least one workload-dependent performance heuristic is dependent on software-provided hint information.

15. A system comprising:
    the apparatus of claim 1, implemented in at least one packaged chip;
    at least one system component; and
    a board,
    wherein, the at least one packaged chip and the at least one system component are assembled on the board.

16. A chip-containing product comprising the system of claim 15, assembled on a further board with at least one other product component.

17. An apparatus comprising:
a cache; and
control circuitry to select at least one cache access transaction to be serviced by the cache from among one or more pending cache access transactions, in which:
in response to a cache allocation transaction being selected by the control circuitry for servicing by the cache, the cache is configured to start a cache allocation process for allocating data into the cache for an address not previously having a valid entry in the cache;
the control circuitry is configured to determine, based on at least one workload-dependent performance heuristic, whether to cancel a remaining part of an unfinished cache allocation process performed for a given cache allocation transaction already selected for servicing by the cache, to free up bandwidth for servicing another cache access transaction;
the at least one workload-dependent performance heuristic is dependent on occupancy of at least one queue structure for queuing the cache access transactions or requests capable of causing cache access transactions to be generated; and
the control circuitry is configured to allow the remaining part of the unfinished cache allocation process to continue without cancellation in response to a determination that occupancy of the queue structure exceeds a threshold occupancy.

18. An apparatus comprising:
a cache; and
control circuitry to select at least one cache access transaction to be serviced by the cache from among one or more pending cache access transactions, in which:
in response to a cache allocation transaction being selected by the control circuitry for servicing by the cache, the cache is configured to start a cache allocation process for allocating data into the cache for an address not previously having a valid entry in the cache;
the control circuitry is configured to determine, based on at least one workload-dependent performance heuristic, whether to cancel a remaining part of an unfinished cache allocation process performed for a given cache allocation transaction already selected for servicing by the cache, to free up bandwidth for servicing another cache access transaction; and
the control circuitry is configured to allow the remaining part of the unfinished cache allocation process to continue without cancellation in response to a determination based on the at least one workload-dependent performance heuristic that a given part of the cache allocation process can be omitted for the given cache allocation transaction because cache allocation information obtained based on a previous access to the cache is available for the given cache allocation transaction.

* * * * *